US007051899B1

(12) United States Patent
Offenhauer et al.

(10) Patent No.: US 7,051,899 B1
(45) Date of Patent: May 30, 2006

(54) CAROUSEL-TYPE HOLDER FOR DISPENSERS FOR TAPE MARKER FLAGS AND POST-IT STACKS

(76) Inventors: Keith Offenhauer, 629 17th Ave. West, Bradenton, FL (US) 34205; Harold Zimmermann, 1270 Glen Ave., Morristown, NJ (US) 08057

( * ) Notice: Subject to any disclaimer, the term of this patent is extended or adjusted under 35 U.S.C. 154(b) by 439 days.

(21) Appl. No.: 10/673,607

(22) Filed: Sep. 25, 2003

(51) Int. Cl.
*B65G 59/00* (2006.01)
*B65H 3/44* (2006.01)
*G07F 11/00* (2006.01)

(52) U.S. Cl. .......................... 221/124; 221/46; 221/62; 221/92; 211/168; 211/169

(58) Field of Classification Search ................ 221/124, 221/45, 155, 277, 282, 287; 206/215, 449, 206/555, 494; 211/78, 95, 171, 169, 168, 211/163
See application file for complete search history.

(56) References Cited

U.S. PATENT DOCUMENTS 4,401,233 A 8/1983 Frey
4,416,392 A 11/1983 Smith
4,562,938 A 1/1986 Loder
4,580,685 A * 4/1986 Jorquez ....................... 211/56
4,735,317 A * 4/1988 Sussman et al. ............ 206/449
4,770,320 A * 9/1988 Miles et al. .................. 221/33
4,781,306 A 11/1988 Smith
4,784,277 A * 11/1988 Wallish et al. .............. 211/167
4,796,781 A 1/1989 Windorski
4,848,584 A 7/1989 Windorski
4,921,127 A 5/1990 Windorski
4,964,519 A 10/1990 Sugarman et al.
4,986,440 A 1/1991 Windorski
4,993,590 A 2/1991 Windorski
D317,383 S * 6/1991 Brill et al. ................... D6/455
5,033,626 A * 7/1991 Platti ........................... 211/37
5,037,000 A * 8/1991 Selame ....................... 221/303
5,067,628 A 11/1991 Evenson
5,080,254 A 1/1992 Feer
5,080,255 A 1/1992 Windorski
5,086,946 A 2/1992 Blackwell
D327,294 S 6/1992 Feer
5,143,250 A 9/1992 Freitag
5,158,205 A 10/1992 Bodziak et al.
5,165,570 A 11/1992 Windorski et al.

(Continued)

*Primary Examiner*—Kathy Matecki
*Assistant Examiner*—Rakesh Kumar
(74) *Attorney, Agent, or Firm*—Charles J. Prescott

(57) ABSTRACT

A carousel-type holder for dispensing tape marker flags and flexible sheet material from a stack including a plurality of sheets disposed one on top of another, each sheet having a band of relatively releasable repositionable adhesive coated along one edge thereof, the sheets being stacked with the adhesive coated edge of each successive sheet disposed along alternate opposite edges to maintain the sheets in the stack. The dispensers include an enlarged body portion having an open ended, tubular neck portion and a supply of tape marker flags in the body portion. A preferred base is adapted to be received and supported on a substantially horizontal supporting surface while a housing is supported for rotation by said base about an upright rotational axis including a plurality of outwardly opening upright holding cavities and an openable side door for each holding cavity. Dispensers and stacks, as preferred and preselected, are each removably receivable in a predetermined position in one cavity, the neck portion of each dispenser aligned with the slot whereby the flags and sheets may be selectively withdrawn through the corresponding slot one at a time.

4 Claims, 4 Drawing Sheets

U.S. PATENT DOCUMENTS

| | | | | |
|---|---|---|---|---|
| 5,167,346 | A | | 12/1992 | Bodziak |
| 5,183,153 | A | | 2/1993 | Linn |
| 5,299,712 | A | | 4/1994 | Carlson et al. |
| 5,358,141 | A | | 10/1994 | Carlson et al. |
| 5,397,117 | A | | 3/1995 | Mertens |
| 5,411,168 | A | | 5/1995 | Mertens et al. |
| 5,518,144 | A | | 5/1996 | Samuelson et al. |
| 5,526,955 | A | | 6/1996 | Windorski et al. |
| 5,702,284 | A | * | 12/1997 | Gallegos ..................... 446/475 |
| 5,755,337 | A | * | 5/1998 | Linn ......................... 211/13.1 |
| 5,769,270 | A | | 6/1998 | Fujisawa et al. |
| 5,794,815 | A | | 8/1998 | Carlson et al. |
| D404,224 | S | * | 1/1999 | Favetta ........................ D6/455 |
| 5,964,375 | A | | 10/1999 | Carlson et al. |
| 6,068,138 | A | | 5/2000 | Carlson et al. |
| 6,206,493 | B1 | * | 3/2001 | Sanchez-Levin et al. ... 312/125 |
| 6,382,428 | B1 | | 5/2002 | Hurwitz |
| 6,443,317 | B1 | * | 9/2002 | Brozak, Jr. ................ 211/85.1 |
| 6,571,951 | B1 | | 6/2003 | Levine et al. |
| D500,418 | S | * | 1/2005 | Levin et al. ................. D6/457 |
| 2002/0066705 | A1 | * | 6/2002 | Chow et al. .................. 211/40 |
| 2003/0075470 | A1 | * | 4/2003 | Cameron et al. ........... 206/440 |

* cited by examiner

CAROUSEL-TYPE HOLDER FOR DISPENSERS FOR TAPE MARKER FLAGS AND POST-IT STACKS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to office desktop accessories and more particularly to a carousel-type holder disposable on a horizontal working surface for holding dispensers for tape marker flags and stacks of POST-IT lightly adhesive sheets.

2. Description of Related Art

The use of lightly adhesive POST-IT sheets having write-on surfaces for adhesively attaching notes and memos to other objects has become well known and is a part of every well-organized desk and office work surface. These conventional POST-IT pads are available in separate stacks, removable one sheet at a time, each sheet having a light adhesive over common edge margins to maintain the stack.

The next improvement in the POST-IT type product has been the alternate edge adhesive attachment between successive sheets which has facilitated dispensing the POST-IT sheets one at a time from a suitably constructed holder. A still further improvement in this basic concept of alternate adhesive attachment between adjacent sheets has extended into tape marker flags having a portion thereof bearing a highlighted color to draw attention to an area of a work document such as for indicating a signature line and the like.

The following prior U.S. patents deal with holders for the alternately attached POST-IT stacks and tape marker flag dispensers specially constructed for the dispensing of the tape marker flags one at a time for adhesive attachment to other objects:

U.S. Pat. No. 4,781,306 to Smith
U.S. Pat. No. 5,411,168 to Mertens et al.
U.S. Pat. No. 4,964,519 to Sugarman et al.
U.S. Pat. No. 5,526,955 to Windorski et al.
U.S. Pat. No. 4,562,938 to Loder
U.S. Pat. No. 5,794,815 to Carlson et al.
U.S. Pat. No. 4,401,233 to Frey
U.S. Pat. No. 4,921,127 to Windorski
U.S. Pat. No. 4,796,781 to Windorski
U.S. Pat. No. 4,986,440 to Windorski
U.S. Pat. No. 4,416,392 to Smith
U.S. Pat. No. 5,397,117 to Mertens
U.S. Pat. No. 4,848,584 to Windorski
U.S. Pat. No. 5,080,254 to Feer
U.S. Pat. No. 6,571,951 to Levine
U.S. Pat. No. 6,382,428 to Hurwitz
U.S. Pat. No. 6,068,138 to Carlson et al.

U.S. Pat. No. 5,964,375 to Carlson et al.
U.S. Pat. No. 5,769,270 to Fujisawa et al.
U.S. Pat. No. 5,518,144 to Samuelson et al.
U.S. Pat. No. 5,358,141 to Carlson et al.
U.S. Pat. No. 5,299,712 to Carlson et al.
U.S. Pat. No. 5,183,153 to Linn
U.S. Pat. No. 5,167,346 to Bodziak
U.S. Pat. No. 5,165,570 to Windorski et al.
U.S. Pat. No. 5,158,205 to Bodziak et al.
U.S. Pat. No. 5,143,250 to Freitag
U.S. Pat. No. 5,086,946 to Blackwell et al.
U.S. Pat. No. 5,080,255 to Windorski
U.S. Pat. No. 5,067,628 to Evenson
U.S. Pat. No. 4,993,590 to Windorski
U.S. Pat. No. D327294 to Feer The present invention not only takes advantage of the alternately attached POST-IT type stack of sheets and pre-packaged tape marker flags held within a dispenser, but also may utilize unpackaged or naked stacks of the tape marker flags for greater economy.

The POST-IT products, as well as the adhesive marker flags, are now available in an array of sizes and some attempt as shown in U.S. Pat. No. 4,964,519 to accommodate holding at least two separate configurations of these products is there shown. However, the present invention goes substantially further in providing a carousel-type structure which will hold a plurality of differently sized such products either in the form of prepackaged tape marker flags, unpackaged or naked tape marker flags and stacked POST-IT sheets, all of which are readily available by simply rotating the carousel housing about its upright axis to the selection desired which is then removable one at a time by simply pulling the selected one from the slot formed in the side door which covers each of these adhesive products.

BRIEF SUMMARY OF THE INVENTION

This invention is directed to a carousel-type holder for dispensing tape marker flags and flexible sheet material from a stack including a plurality of sheets disposed one on top of another, each sheet having a band of relatively releasable repositionable adhesive coated along one edge thereof, the sheets being stacked with the adhesive coated edge of each successive sheet disposed along alternate opposite edges to maintain the sheets in the stack. The dispensers include an enlarged body portion having an open ended, tubular neck portion and a supply of tape marker flags in the body portion. A preferred base is adapted to be received and supported on a substantially horizontal supporting surface while a housing is supported for rotation by said base about an upright rotational axis including a plurality of outwardly opening upright holding cavities and an openable side door for each holding cavity. Dispensers and stacks, as preferred and preselected, are each removably receivable in a predetermined position in one cavity, the neck portion of each dispenser aligned with the slot whereby the flags and sheets may be selectively withdrawn through the corresponding slot one at a time.

It is therefore an object of this invention to provide a carousel-type holder for dispensers of tape marker flags and stacks of POST-IT sheets one at a time from selected individual sections of the housing of the device.

Yet another object of this invention is to provide a holder for a broad range of sizes of the various available tape marker flags and stacks of POST-IT note sheets, all of which are contained in a single housing for ready withdrawal therefrom.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
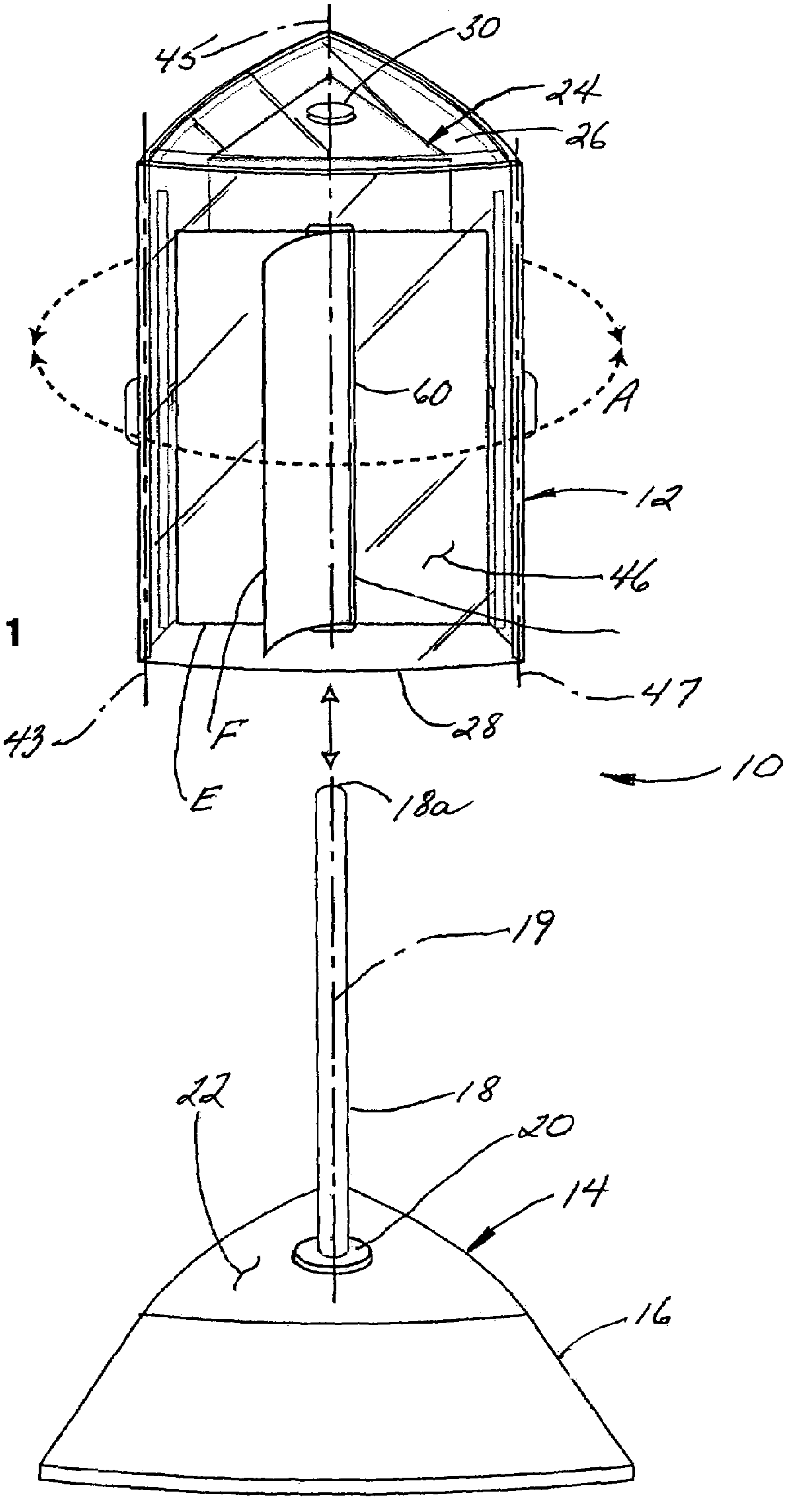
FIG. 1 is an exploded perspective view of the preferred embodiment of the invention.

Referring now to the drawings, the preferred embodiment of the invention is there shown in exploded perspective form in FIG. 1 generally at numeral 10. This carousel-type holder 10 generally includes a housing 12 and a base 14, the base 14 being receivable and supported atop a generally horizontal work surface such as that of a desk or countertop. Both housing 12 and base member 16 are formed of molded, preferably transparent or translucent plastic material.

The base member 16 has a complementary truncated three-sided pyramid-type shape to that of the housing 12 and includes an elongated upright support shaft 18 extending upwardly therefrom about a vertical rotational axis 19. A reinforcing plate 20 attached to the top surface 22 of the base member 16 is also provided.

Figure 3:
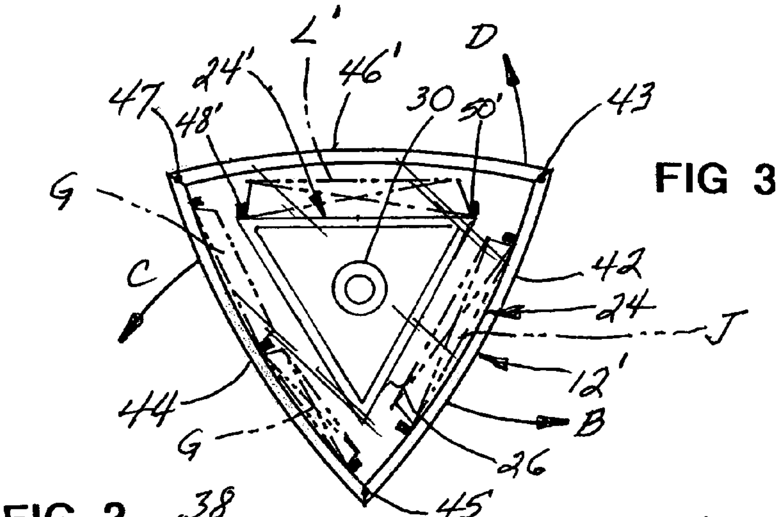
FIG. 3 is a top elevation view of an alternate embodiment of FIG. 2 showing the various sized tape marker flag dispensers in phantom.
Figure 2:
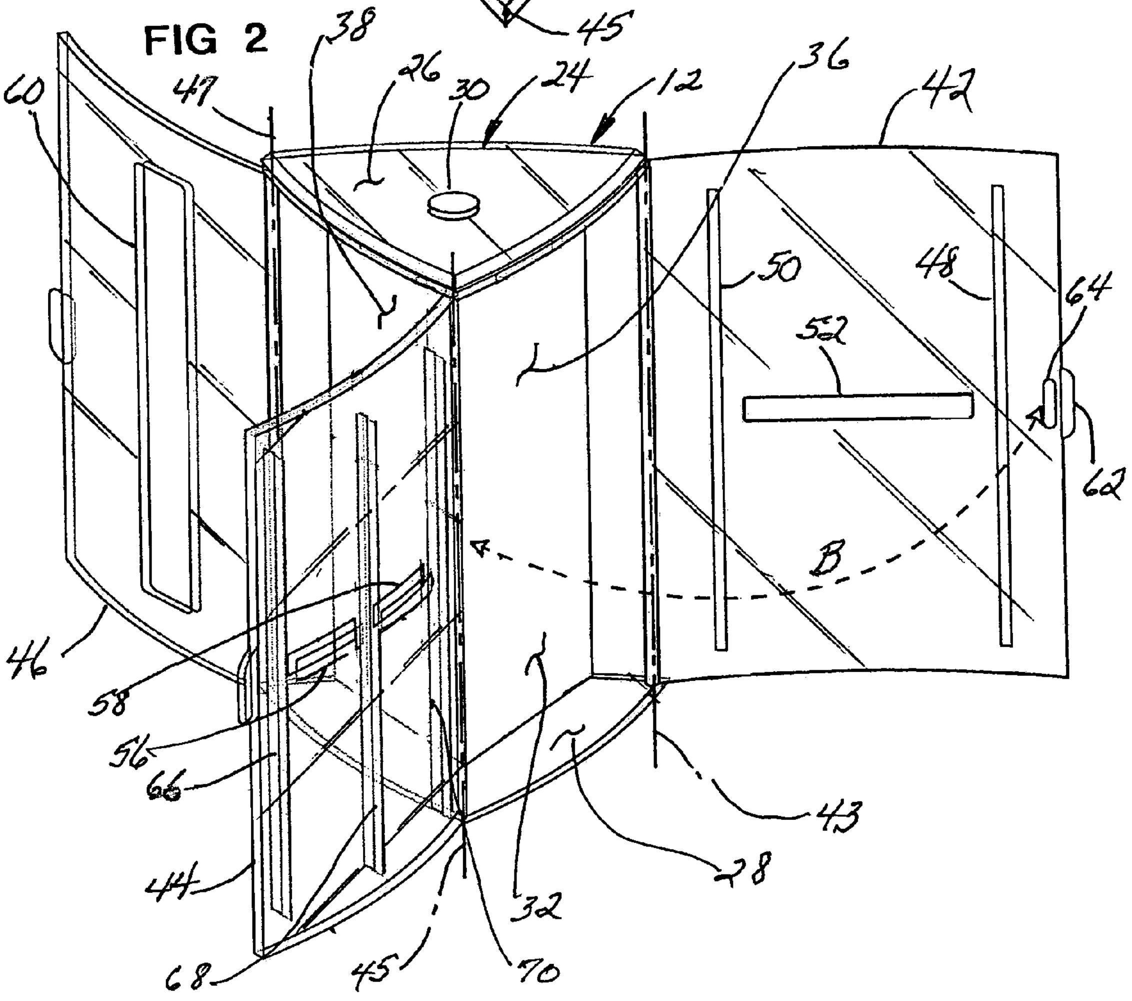
FIG. 2 is a perspective view of the housing shown in FIG. 1 with all of the side doors in the open position.
Figure 3A:
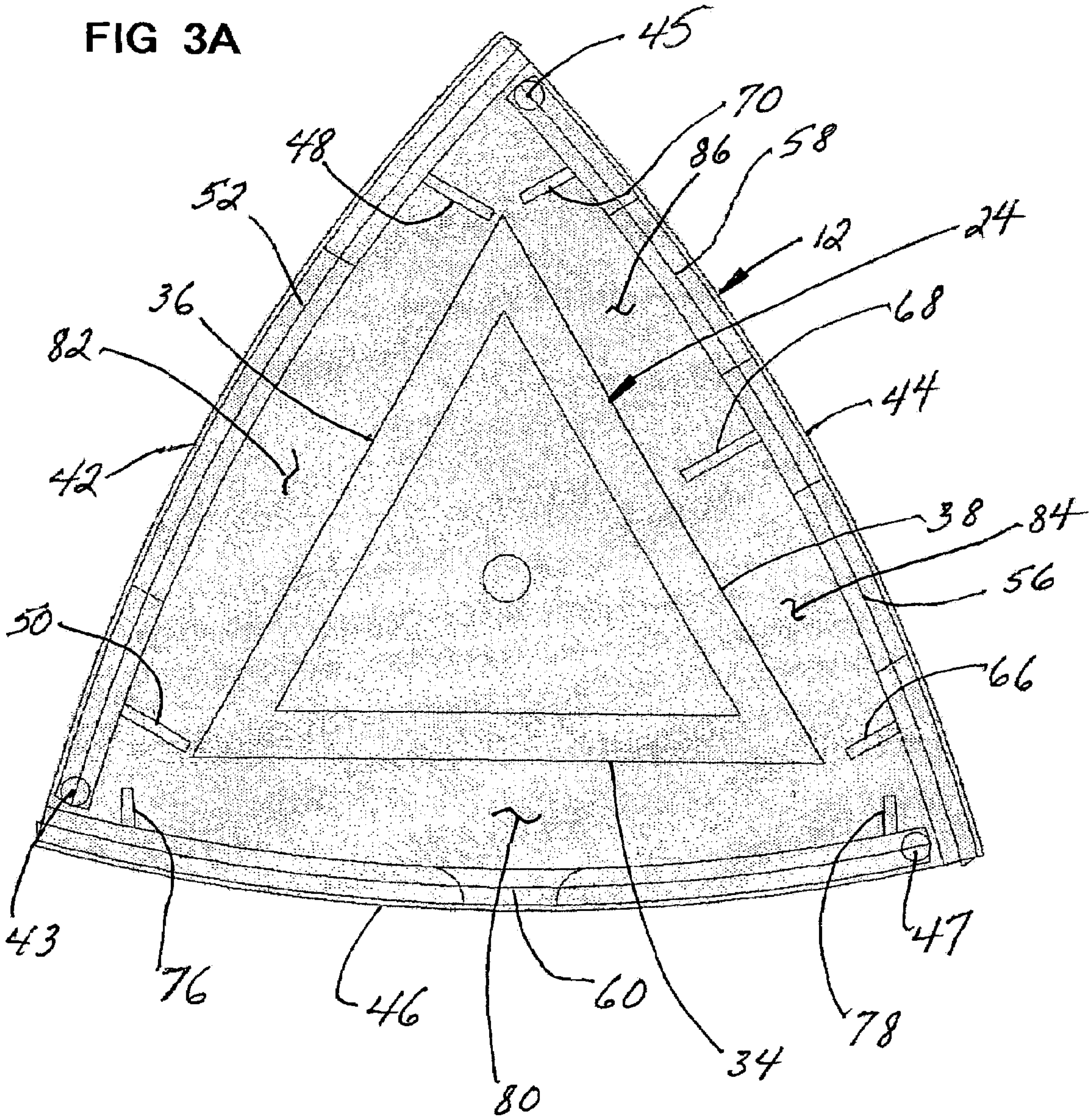
FIG. 3A is an enlarged top plan view of FIG. 1.
Figure 4:
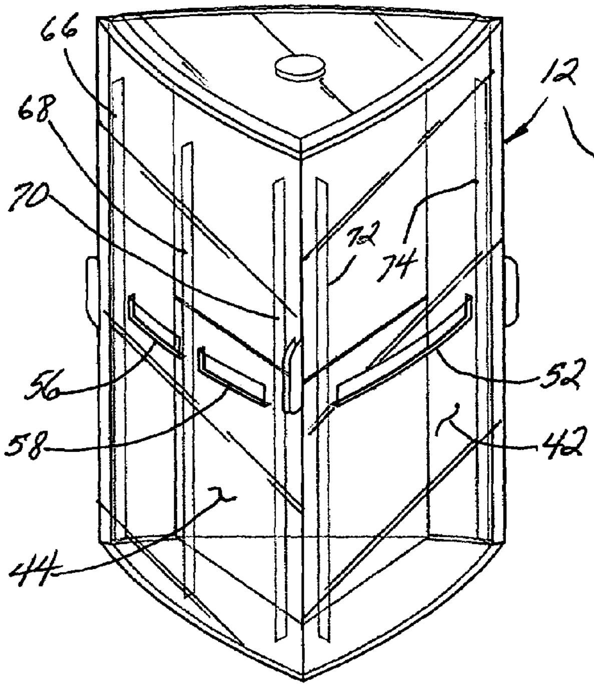
FIGS. 4 and 5 are perspective views from two different angles of the embodiment of the invention shown in FIG. 1.
Figure 5:
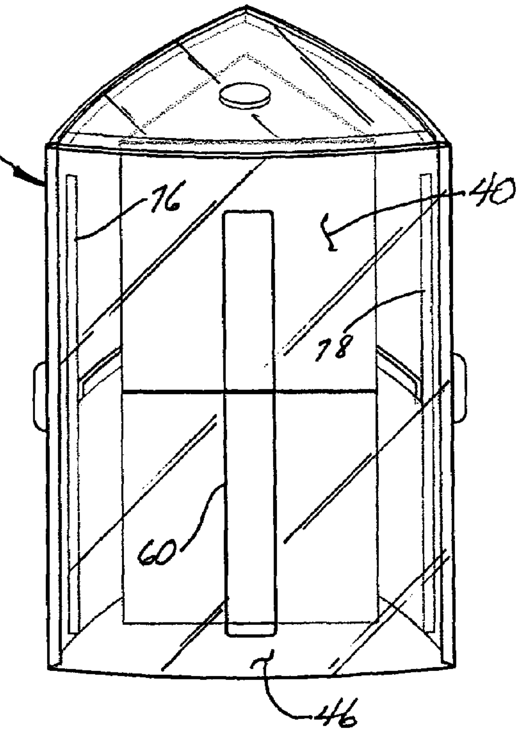

The housing 12, as also seen in FIGS. 2, 3 and at 12' in FIG. 3A includes an upright inner frame or core 24 or 24' in FIG. 3 which generally includes three equally sized upright inner cavity walls 34, 36 and 38 formed into a triangular cross section in the plan view having top and bottom wall portions 26 and 28, respectively, attached at the upper and lower ends, respectively. In the preferred embodiment, the plan profile of the top and bottom wall portions 26 and 28 are arcuate segments forming an enlarged triangular shape generally in stylish cooperation with the top profile of the inner frame 24. However, a straight-edged profile and other multi-sided shapes are envisioned.

Individual holding cavities are defined between the inner cavity walls 34, 36 and 38 and spaced pairs of positioning or retaining strips 76/78, 48/50, and 66/68 and 68/70, respectively. As seen in FIG. 3A, these holding cavities are shown generally at 80, 82, 84 and 86.

Each of these cavities 80, 82, and 84/86 is enclosed by a separate side door 42, 44 and 46 and 46' in FIG. 3. Each of these side doors is pivotally attached at the corners of the top and bottom panels 26 and 28 about respective upright pivotal axes 43, 45 and 47 and pivotally open in the direction of arrows B, C and D in FIGS. 2 and 3. Interfering latch and handle structure is shown generally at numerals 62 and 64 in FIG. 2 only. Alternately, other detent interfering structure may be utilized to maintain each of these side doors in a closed position.

The side doors, 42, 44, 46 and 46' include elongated slots 52, 56/58, and 60, respectively formed centrally therethrough as shown, each of which is sized according to the width of the respective tape marker flags and POST-IT adhesive sheets preselected for being held within the corresponding holding cavities as will be described more fully herebelow.

The housing 12 or 12' is preferably supported by the elongated support shaft 18 about its rotational axis 19, the support shaft 18 being insertable centrally through a passageway formed longitudinally through the inner frame 24 and receiving support at its upper distal end 18*a* against a support bearing 30 attached to the inner surface of the top wall portion 26. By this means, housings 12 and 12' are freely rotatable in the direction of arrow A in FIG. 1 about the upright rotational axis 19.

Holding cavities 82, 84 and 86 are, by design choice, sized in width, as established by retention strips 48/50, 66/68 and 68/70, respectively, to frictionally receive a dispenser shown in phantom at G, J, L and L' in FIG. 3 and in solid lines in FIGS. 4 to 7, each dispenser including an enlarged body portion having a laterally extending, open-ended tubular neck portion of elongated cross sectional length and reduced cross sectional width positioned centrally on the body portion. A supply of tape marker flags are held within the body portion, each marker flag being individually dispensable through the neck portion of the dispenser. Details of this well-known prior art structure have been disclosed in U.S. Pat. No. 5,411,168 as also set forth in the prior art summary hereinabove. Again, note the economical substitution of a naked stack of tape marker flags not held in the dispenser.

Figure 6:
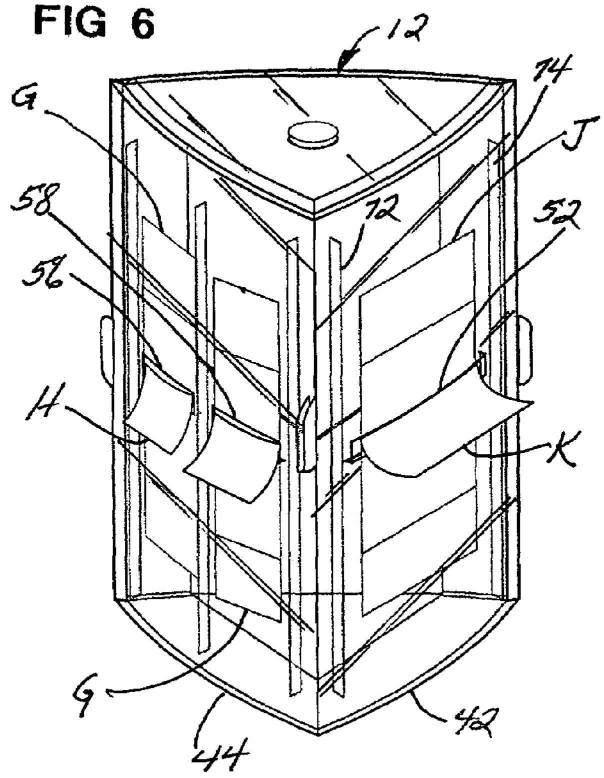
FIGS. 6 and 7 are views similar to FIGS. 4 and 5 showing the tape marker flags and POST-IT note sheet stack held within the housing ready for use.
Figure 7:
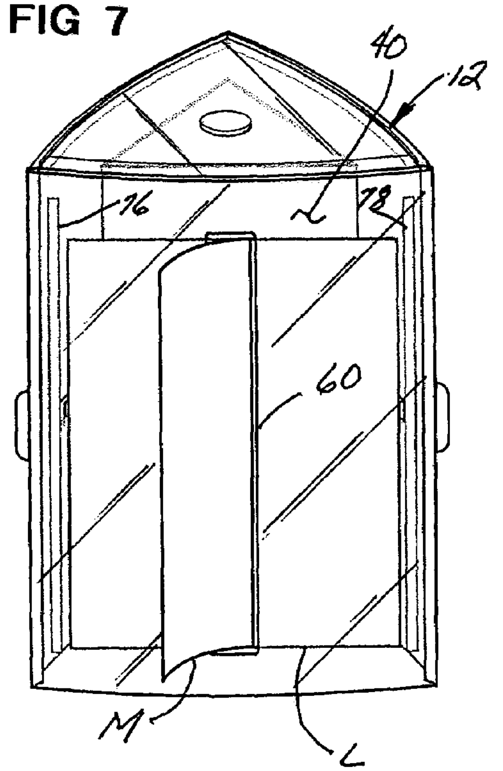

When the corresponding side doors 42, 44, 46 or 46' are in the open position, the preselected dispenser G, J, L or L' may be inserted between the respective pairs of retention strips with the next ready tape marker flag H, K, and M, as seen in FIGS. 6 and 7, being inserted outwardly through the respective slots 56, 58, 52 and 60. Thereafter, the side door is pivotally moved about the upright support axes 43, 45 and 47 into the closed position. The entire housing 12 is positionable over the upright support shaft 18, whereafter the housing may be freely rotated in the direction of arrow A in FIG. 1 to orient the particular side door enclosing the desired tape marker flag to face the user for easy removal therefrom.

Alternately to placing a dispenser filled with tape marker flags into the largest of the cavities 80 which has the vertical slot 60 formed through the corresponding side door 46, a stack of conventional alternately attached POST-IT sheets may be inserted between the retention strips 76 and 78. The back or bottom sheet of each of the POST-IT stacks may bear against inner cavity wall 34 to maintain the top sheet in closer alignment with, and passing outwardly from, upright slot 60 for ready access and dispensing of a POST-IT sheet one at a time by manually drawing it therefrom.

Note in FIG. 3 that, although it is preferred to have the retention strips formed as a unit with, and extending inwardly from, the inner surface of each of the side doors, alternately, these retention strips 48' and 50' may be attached to the corresponding inner cavity wall for frictionally receiving and holding the dispenser L'.

Note further that any predetermined or preselected combination of sizes of dispensers and corresponding tape marker flags or stacks of naked tape marker flags held therewithin and POST-IT stacks may be accommodated by the selection of corresponding size of slots through which the tape marker flags and POST-IT sheets are removed one at a time and the spacing between the retention strips for releasable securement of the selected dispenser and POST-IT stack.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A carousel-type holder for a dispenser for tape marker flags and a separate stack of flexible sheet material including a plurality of sheets disposed one on top of another, each sheet having a band of relatively releasable repositionable adhesive coated along one edge thereof, the sheets being stacked with the adhesive coated edge of each successive sheet disposed along alternate opposite edges to maintain the sheets in the stack, the dispenser including an enlarged body portion having a laterally extending, open ended, tubular neck portion of elongated cross sectional length and reduced cross sectional width positioned centrally on the body portion, and a supply of tape marker flags in the body portion, the marker flags being individually dispensable through the neck portion, said holder comprising:

- a base which is adapted to be received and supported on a substantially horizontal supporting surface;
- a housing supported for rotation by said base about an upright rotational axis and including a top wall portion, a bottom wall portion, a plurality of outwardly opening upright holding cavities and openable side doors attached to said housing for enclosing each of said holding cavities, each of said side doors having an elongated slot formed centrally therethrough, each dispenser and each stack being removably receivable in a predetermined position into a separate predetermined said cavity wherein the neck portion is positioned in close alignment with said slot, each corresponding said side door releasably retaining each dispenser and stack in the predetermined position in said housing whereby one of the flags and sheets may be selectively withdrawn through the corresponding said slot one at a time.

2. A carousel-type holder for three dispensers for tape marker flags, each dispenser being of a different size and held in an enlarged body portion having a laterally extending, open ended, tubular neck portion of elongated cross sectional length and reduced cross sectional width positioned centrally on the body portion, and a supply of tape marker flags in the body portion, the marker flags being individually dispensable through the neck portion, said holder comprising:

- a base which is adapted to be received and supported on a substantially horizontal supporting surface and including an upright elongated support shaft upwardly extending from said base;
- a housing having a generally triangular top profile and supported for rotation by said support shaft about an upright rotational axis positioned centrally in said housing, said housing including a top wall portion, a bottom wall portion, and three upright inner frame panels collectively defining three outwardly opening upright holding cavities;
- a pivotally openable side door for enclosing each of said holding cavities, each of said side doors depending from between said top and bottom wall portions and having an elongated slot formed centrally therethrough, each dispenser being removably receivable in a predetermined position in one of said cavities wherein said neck portion is positioned in close alignment with said slot, each corresponding said side door releasably retaining each corresponding dispenser in the predetermined position in said housing when closed, whereby one of the flags may be selectively withdrawn through each corresponding said slot one at a time.

3. A carousel-type holder for a plurality of dispensers for tape marker flags, each dispenser including an enlarged body portion having a laterally extending, open ended, tubular neck portion and a supply of tape marker flags in the body portion, the marker flags being individually dispensable through the neck portion, said holder comprising:

- a base which is adapted to be received and supported on a substantially horizontal supporting surface and including an upright upwardly extending elongated support shaft attached thereto;
- an upright multi-sided housing supported for rotation by said support shaft about an upright central rotational axis extending longitudinally through said housing, said housing including multi-sided top walls and matching bottom wall portions, and a multi-sided upright frame extending therebetween of similar but smaller size than said wall portions;
- a plurality of outwardly opening upright holding cavities each defined by said wall portions, said upright frame and an openable side door for each of said holding cavities, each of said side doors depending from and pivotable about an upright axis between vertically aligned corners of said wall portions and having an elongated slot formed centrally therethrough, each dispenser being removably receivable in a predetermined position in one of said cavities wherein said neck portion is positioned in alignment and close proximity to said slot, each corresponding said side door releasably retaining the dispenser in the predetermined position in said housing when closed whereby the flags may be selectively withdrawn through the corresponding said slot one at a time.

4. A carousel-type holder for dispensers for tape marker flags and a stack of flexible sheet material including a plurality of sheets disposed one on top of another, each sheet having a band of relatively releasable repositionable adhesive coated along one edge thereof and the sheets are stacked with the adhesive coated edge of each successive sheet disposed along alternate opposite edges to maintain the sheets in the stack, the dispenser including an enlarged body portion having a laterally extending, open ended, tubular neck portion of elongated cross sectional length and reduced cross sectional width positioned centrally on the body portion, and a supply of tape marker flags in the body portion, the marker flags being individually dispensable through the neck portion, said holder comprising:

- a housing adapted to be received and supported for manual rotation on a substantially horizontal surface and including a top wall portion, a bottom wall portion, a plurality of outwardly opening upright holding cavities and an openable side door attached to said housing for enclosing each of said holding cavities and having an elongated slot therein, each dispenser and stack each being removably receivable in a predetermined position in one of said cavities wherein said neck portion is positioned against said slot, each corresponding said side door releasably retaining the dispenser and the stack in said predetermined position in said housing whereby one of the flags and one of the sheets may be selectively withdrawn through the corresponding said slot one at a time.

* * * * *